(12) United States Patent
Abernathy et al.

(10) Patent No.: US 7,900,024 B2
(45) Date of Patent: *Mar. 1, 2011

(54) HANDLING DATA CACHE MISSES OUT-OF-ORDER FOR ASYNCHRONOUS PIPELINES

(75) Inventors: Christopher M. Abernathy, Austin, TX (US); Jeffrey P. Bradford, Rochester, MN (US); Ronald P. Hall, Cedar Park, TX (US); Timothy H. Heil, Rochester, MN (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 12/253,448

(22) Filed: Oct. 17, 2008

(65) Prior Publication Data

US 2009/0043995 A1    Feb. 12, 2009

Related U.S. Application Data

(63) Continuation of application No. 11/345,922, filed on Feb. 2, 2006, now Pat. No. 7,461,239.

(51) Int. Cl.
*G06F 9/312* (2006.01)

(52) U.S. Cl. ........................................ 712/220; 712/225

(58) Field of Classification Search ........................ None
See application file for complete search history.

(56) References Cited

U.S. PATENT DOCUMENTS

| 5,590,368 | A | 12/1996 | Heeb et al. |
| 5,828,860 | A | 10/1998 | Miyaoku et al. |
| 6,173,410 | B1* | 1/2001 | Bondi et al. ................. 713/324 |
| 6,216,219 | B1 | 4/2001 | Cai et al. |
| 2003/0061470 | A1 | 3/2003 | Yeh |
| 2003/0126379 | A1* | 7/2003 | Kaushik et al. ............. 711/150 |
| 2007/0022278 | A1 | 1/2007 | Abernathy et al. |

OTHER PUBLICATIONS

Martinez, Jose F., et al., Cherry: Checkpointed Early Resource Recycling in Out-of-order Microprocessors, 2002, IEEE, pp. 3-14.*

* cited by examiner

*Primary Examiner*—Eric Coleman
(74) *Attorney, Agent, or Firm*—Stephen J. Walder, Jr.; Matthew B. Talpis

(57) ABSTRACT

Mechanisms for handling data cache misses out-of-order for asynchronous pipelines are provided. The mechanisms associate load tag (LTAG) identifiers with the load instructions and uses them to track the load instruction across multiple pipelines as an index into a load table data structure of a load target buffer. The load table is used to manage cache "hits" and "misses" and to aid in the recycling of data from the L2 cache. With cache misses, the LTAG indexed load table permits load data to recycle from the L2 cache in any order. When the load instruction issues and sees its corresponding entry in the load table marked as a "miss," the effects of issuance of the load instruction are canceled and the load instruction is stored in the load table for future reissuing to the instruction pipeline when the required data is recycled.

12 Claims, 7 Drawing Sheets

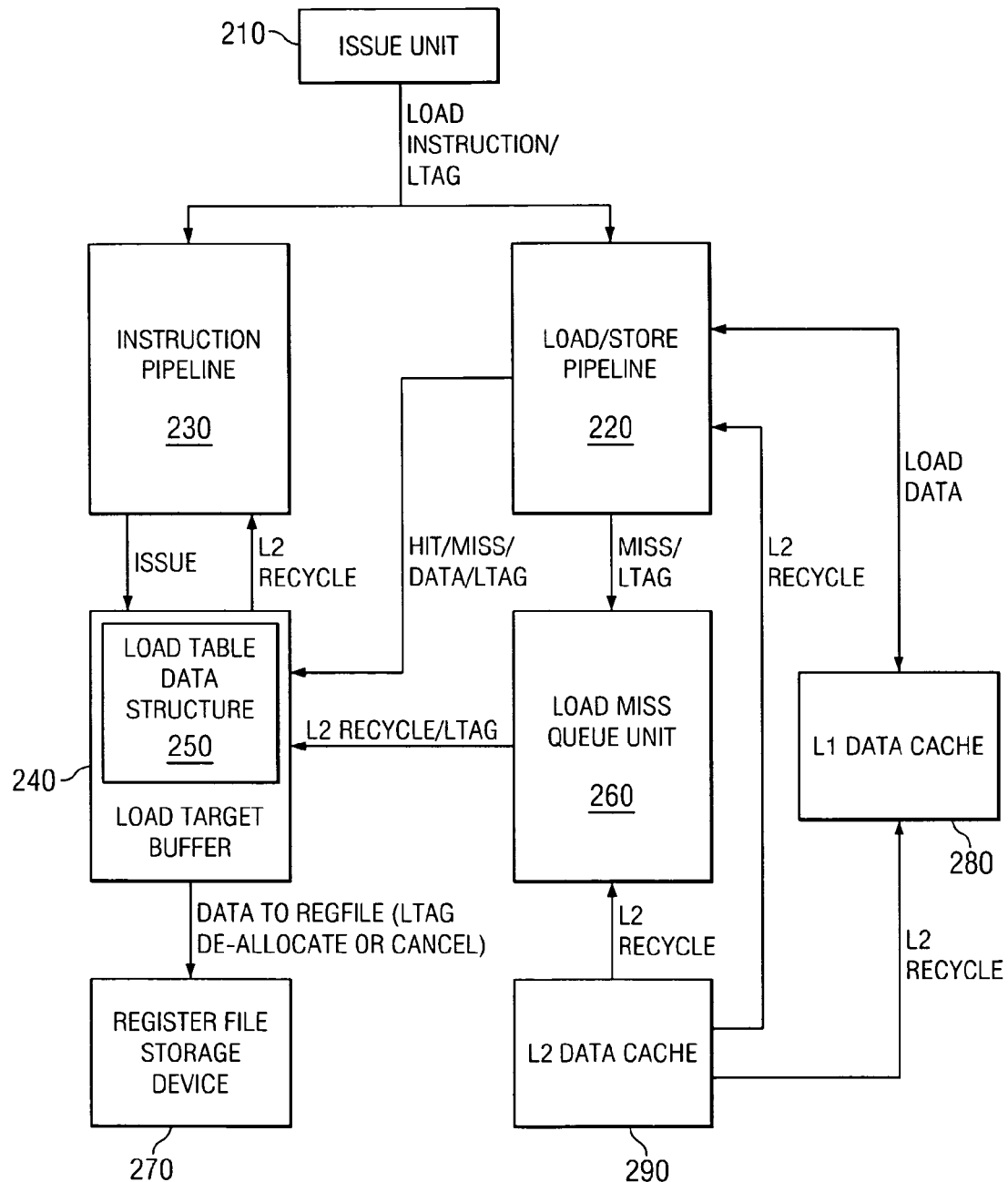

US 7,900,024 B2

HANDLING DATA CACHE MISSES OUT-OF-ORDER FOR ASYNCHRONOUS PIPELINES

This application is a continuation of application Ser. No. 11/345,922, filed Feb. 2, 2006, now U.S. Pat. No. 7,461,239 status awaiting publication.

BACKGROUND

1. Technical Field

The present application relates generally to an improved data processing system. More specifically, the present application is directed to an apparatus and method for handling data cache misses out-of-order for asynchronous pipelines.

2. Description of Related Art

Most modern computing systems make use of caches to help speed up data transfers and instruction execution. These temporary caches serve as staging areas, and their contents are constantly changing. A memory cache is a memory bank that bridges main memory and the processor of a microprocessor chip. The memory cache is faster than main memory and allows instructions to be executed and data to be read and written at higher speed.

Instructions and data are transferred from main memory to the cache in blocks, using a look-ahead algorithm. The more sequential the instructions in the routine being executed or the more sequential the data being read or written, the greater chance the next required item will already be in the cache, resulting in better performance.

A level 1 (L1) cache is a memory bank built into the microprocessor chip. Also known as the "primary cache," an L1 cache is the memory closest to the processor. A level 2 cache (L2) is a secondary staging area that feeds the L1 cache. Increasing the size of the L2 cache may speed up some applications but have no effect on others. The L2 cache may be built into the microprocessor chip, reside on a separate chip in a multi-chip package module or be a separate bank of chips on the motherboard, for example. Caches are typically static RAM (SRAM), while main memory is generally some variety of dynamic RAM (DRAM).

In addition to caching of data and instructions, many modern computing systems make use of pipelines for performing simultaneous, or parallel, processing. Operations are overlapped by moving data and/or instructions into a conceptual pipe with all stages of the pipe processing simultaneously. For example, while one instruction is being executed, the computer is decoding the next instruction. In vector processors, several steps in a floating point operation can be processed simultaneously.

Microprocessors and pipelines may be either in-order or out-of-order. In-order microprocessors or pipelines process instructions and data in the order in which they are dispatched. Out-of-order microprocessors or pipelines may process the instructions and data in a different order from the order in which they are dispatched. An out-of-order execution architecture takes code that was written and compiled to be executed in a specific order, reschedules the sequence of instructions, if possible, so as to make maximum use of processor resources, executes them, and then arranges them back in their original order so that the results can be written out to memory. To the user, the execution appears as if an ordered, sequential stream of instructions went into the processor and an identically ordered, sequential stream of computational results emerged. Only the processor knows in what order the program's instructions were actually executed.

Complexity arises in an in-order microprocessor when encountering L1 data cache misses, e.g., in response to execution of a load instruction in the pipeline. Because the in-order microprocessor requires the instructions and data to be processed in-order, most in-order microprocessors flush the instructions younger than the missed load right away. That is, any instructions in the pipeline that were placed in the pipeline after the missed load instruction are not executed by the pipeline since it is assumed that these instructions are dependent upon the missed load instruction or may otherwise modify the data associated with the missed load instruction.

Alternatively, some in-order microprocessors wait to flush the instructions and data in the pipeline until a dependency upon the load instruction that missed is encountered. This approach is better performing because it allows non-dependent instructions younger than the missed load instruction to execute even though there is an older outstanding instruction, i.e. the missed load instruction, which must be executed again later. This leads to out-of-order behavior in an in-order processor because the missed load instruction must be reissued when the data is present in the L1 data cache, effectively out-of-order in relation to the rest of the program flow.

Further complexity arises when there are multiple pipelines that a load instruction must travel through, and the pipelines are asynchronous to each other. Such a scenario may exist when the address generation and the cache access are done by a first pipeline, while the placing of data into the architected register is done by a second pipeline that is asynchronous to the first pipeline. Additional complexities arise when exceptions exist, sometimes very late, which may flush a load instruction in one of the asynchronous pipelines.

SUMMARY

In view of the above, it would be beneficial to have an improved mechanism for handling L1 data cache misses in a microprocessor. It would further be beneficial to have an improved mechanism for handling L1 data cache misses in a microprocessor having multiple asynchronous pipelines. Furthermore, it would be beneficial to have an improved mechanism for handling L1 data cache misses that accommodates exceptions in each of the asynchronous pipelines. The illustrative embodiments of the present invention provide such an improved mechanism.

With the illustrative embodiments, load table data structures and load target buffers are provided in a microprocessor for each pipeline that is asynchronous in relation to other pipelines. The load target buffers include the load table data structures and state machines for controlling the processing of load instructions issued by the pipelines based on a current state of the load instruction as determined from the load table data structures.

With load instructions that are sent to two or more asynchronous pipelines, the mechanism of the illustrative embodiment associates a load tag (LTAG) identifier with the load instructions. This LTAG is used to keep track of each load instruction across multiple pipelines and is used to index into the load table data structure to retrieve a load table entry.

Under normal operation of a load instruction, the data associated with the load instruction is readily available in, and retrieved from, the L1 data cache using a first pipeline. The retrieved data is placed into the load table data structure of the load target buffer in an entry indexed by the LTAG of the corresponding load instruction. The load target buffer essentially serves as a rename register for the load data before it is written into the register file. The corresponding load table is marked as a "hit," indicating that the data is ready and valid for the first pipeline to now use. When the same corresponding load instruction is ready to issue from a second pipeline, its LTAG is used to index into the load table of the load target buffer and retrieve the correct data to load into the register file. The LTAG may then be de-allocated for future load instructions to use and the corresponding entry in the load table is marked as de-allocate or "dealloc."

When the load instruction "misses" the L1 data cache in the load/store pipeline, i.e. the data is not readily available at the normal time to place into the load target buffer, the corresponding entry in the load table indexed by the LTAG is marked as a "miss." A load miss queue is notified of the cache "miss" and waits for the data to be recycled from the L2 cache or other memory subsystem. Once the data returns from the L2 cache or other memory subsystem, it is placed in the L1 cache and is sent to the load target buffer along with the LTAG corresponding to the load instruction. This allows load data to recycle from the L2 cache or other memory subsystem in any order, i.e. not necessarily the same order as when the requests for data were sent out to the L2 cache or other memory subsystem. The corresponding load table entry is then marked as a "hit" if the recycled data is valid.

The corresponding load in the instruction pipeline may be anywhere in the instruction pipeline at this point. The load may still be in the instruction pipeline or it may have already tried to issue and access the load table. For the first case, when the recycle operation completes, the corresponding load table entry is changed from a "miss" to a "hit" before the load instruction issues from the instruction pipeline. From the viewpoint of the load instruction, the miss never occurred, and the load instruction issues in a normal manner causing the data for the load instruction to be loaded into the register file.

When the load instruction issues from the instruction pipeline and sees its corresponding entry in the load table marked as a "miss," the effects of issuance of the load instruction are canceled and the load instruction is saved in the load table for future reissuing to the instruction pipeline. The load table effectively serves as a load miss queue entry here until the load data becomes available. When the recycle operation completes, the corresponding entry in the load table is marked as a "hit" and the load instruction is reissued to the instruction pipeline which executes as normal.

In further illustrative embodiments, the load table entries are provided with mechanisms for determining whether a load instruction is invalidated due to an exception. Moreover, an additional intermediary state is provided between issuance of a load instruction and de-allocation of LTAGs and load table entries in order to facilitate the handling of late exceptions.

In one illustrative embodiment, a method, in a data processing device having an instruction pipeline and a load/store pipeline, for processing load instructions is provided. The method may comprise receiving a load instruction, associating the load instruction with a load tag (LTAG), issuing the load instruction and the LTAG to the load/store pipeline, and attempting to retrieve data corresponding to the load instruction from a first cache. A determination may be made as to whether the attempt to retrieve the data corresponding to the load instruction results in a cache hit or a cache miss. An entry in a load table data structure of a load target buffer may be generated based on the LTAG and results of the attempt to retrieve data corresponding to the load instruction.

The generating of the entry in the load table data structure may comprise generating an entry in the load table that is indexed by the LTAG associated with the load instruction and marking the entry as a cache hit or a cache miss based on results of determining whether the attempt to retrieve the data corresponding to the load instruction results in a cache hit or a cache miss. If the results of determining indicate a cache miss, the method may further comprise recycling the data corresponding to the load instruction from a memory subsystem and storing the recycled data in the entry in the load table.

The recycling of the data corresponding to the load instruction from the memory subsystem may comprise maintaining, in a load miss queue unit, a data structure identifying the LTAG associated with the load instruction and a load address associated with the load instruction corresponding to the data that is being recycled. The recycling may further comprise correlating the recycled data with the load instruction based on the data structure in the load miss queue unit in response to the recycling of the data from the memory subsystem. The recycled data may be stored in the entry in the load table based on the LTAG of the load instruction identified in the data structure in the load miss queue unit.

The method may further comprise marking the entry in the load table as a cache hit only if the recycled data is valid. Alternatively, the entry in the load table may be marked as a cache miss if the recycled data is invalid.

In addition to the above, the method may further comprise issuing the load instruction and the LTAG to the instruction pipeline and issuing the load instruction from the instruction pipeline to the load target buffer. An entry in the load table corresponding to the issued load instruction may be identified based on the LTAG associated with the issued load instruction. A determination may be made as to whether to store the data corresponding to the load instruction in a register file based on whether the identified entry in the load table is marked as a cache miss or a cache hit.

The data corresponding to the load instruction may be stored in the register file if it is determined that the identified entry is marked as a cache hit. The LTAG and the entry in the load table may be de-allocated following storing the data corresponding to the load instruction in the register file.

Any effects of the issuing of the load instruction from the instruction pipeline may be canceled if it is determined that the identified entry in the load table is marked as a cache miss. The identified entry in the load table may be updated as having a pending state if it is determined that the identified entry in the load table is marked as a cache miss.

A representation of the load instruction may be stored in the identified entry of the load table if it is determined that the identified entry in the load table is marked as a cache miss. The load instruction may be reissued to the instruction pipeline based on the representation of the load instruction in the identified entry in response to the data corresponding to the load instruction being recycled from a memory subsystem.

The instruction pipeline and the load/store pipeline may be asynchronous with respect to one another. The data processing device may be a processor and may be part of a multiprocessor heterogeneous data processing system. The multiprocessor heterogeneous data processing system may comprise a control processor and one or more co-processors. The data processing device may be one or more of the control processor or a co-processor in the multiprocessor heterogeneous data processing system.

In another illustrative embodiment, an apparatus is provided that comprises an issue unit, an instruction pipeline coupled to the issue unit, a load/store pipeline coupled to the issue unit, and a load target buffer coupled to the instruction pipeline and the load/store pipeline. The issue unit may receive a load instruction, associate the load instruction with a load tag (LTAG), and issue the load instruction and the LTAG to the load/store pipeline. The load/store pipeline may attempt to retrieve data corresponding to the load instruction from a first level cache and determine whether the attempt to retrieve the data corresponding to the load instruction results in a cache hit or a cache miss. The load target buffer may generate an entry in a load table data structure of the load target buffer based on the LTAG and results of the attempt to retrieve data corresponding to the load instruction.

The load target buffer may generate an entry in the load table data structure by generating an entry in the load table that is indexed by the LTAG associated with the load instruction. The load target buffer may further mark the entry as a cache hit or a cache miss based on results of determining whether the attempt to retrieve the data corresponding to the load instruction results in a cache hit or a cache miss.

The apparatus may further comprise a load miss queue unit coupled to the load/store pipeline. The load miss queue may recycle data corresponding to the load instruction from a second level cache and stores the recycled data in the entry in the load table of the load target buffer if the results of determining whether the attempt to retrieve the data corresponding to the load instruction results in a cache hit or a cache miss indicate a cache miss. The load miss queue unit may recycle the data corresponding to the load instruction from the second level cache by maintaining, in the load miss queue unit, a data structure identifying the LTAG associated with the load instruction and a load address associated with the load instruction corresponding to the data that is being recycled. The load miss queue unit may correlate the recycled data with the load instruction based on the data structure in the load miss queue unit in response to the recycling of the data from the second level cache. The recycled data may be stored in the entry in the load table based on the LTAG of the load instruction identified in the data structure in the load miss queue unit.

The load target buffer may mark the entry in the load table as a cache hit only if the recycled data is valid. The load target buffer may mark the entry in the load table as a cache miss if the recycled data is invalid.

The issue unit may issue the load instruction and the LTAG to the instruction pipeline and the instruction pipeline may issue the load instruction to the load target buffer. The load target buffer may identify an entry in the load table corresponding to the issued load instruction based on the LTAG associated with the issued load instruction. The load target buffer may determine whether to store the data corresponding to the load instruction in a register file based on whether the identified entry in the load table is marked as a cache miss or a cache hit.

The load target buffer may store the data corresponding to the load instruction in the register file if it is determined that the identified entry is marked as a cache hit. The load target buffer may initiate de-allocation of the LTAG and the entry in the load table following storing the data corresponding to the load instruction in the register file. The load target buffer may further initiate canceling any effects of the issuing of the load instruction from the instruction pipeline if it is determined that the identified entry in the load table is marked as a cache miss. The load target buffer may also update the identified entry in the load table as having a pending state if it is determined that the identified entry in the load table is marked as a cache miss.

In addition, the load target buffer may store a representation of the load instruction in the identified entry of the load table if it is determined that the identified entry in the load table is marked as a cache miss. Moreover, the load target buffer may reissue the load instruction to the instruction pipeline based on the representation of the load instruction in the identified entry in response to the data corresponding to the load instruction being recycled from a memory subsystem.

The apparatus may be part of a multiprocessor heterogeneous data processing system. The multiprocessor heterogeneous data processing system may comprise a control processor and one or more co-processors. The apparatus may be one or more of the control processor or a co-processor.

In a further illustrative embodiment, a computer program product comprising a computer useable medium having a computer readable program is provided. The computer readable program, when executed on a computing device, may cause the computing device to perform the various operations of the methodology previously described above.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary block diagram illustrating the operation of the primary elements of an illustrative embodiment;

DETAILED DESCRIPTION OF THE PREFERRED EMBODIMENTS

Figure 1:
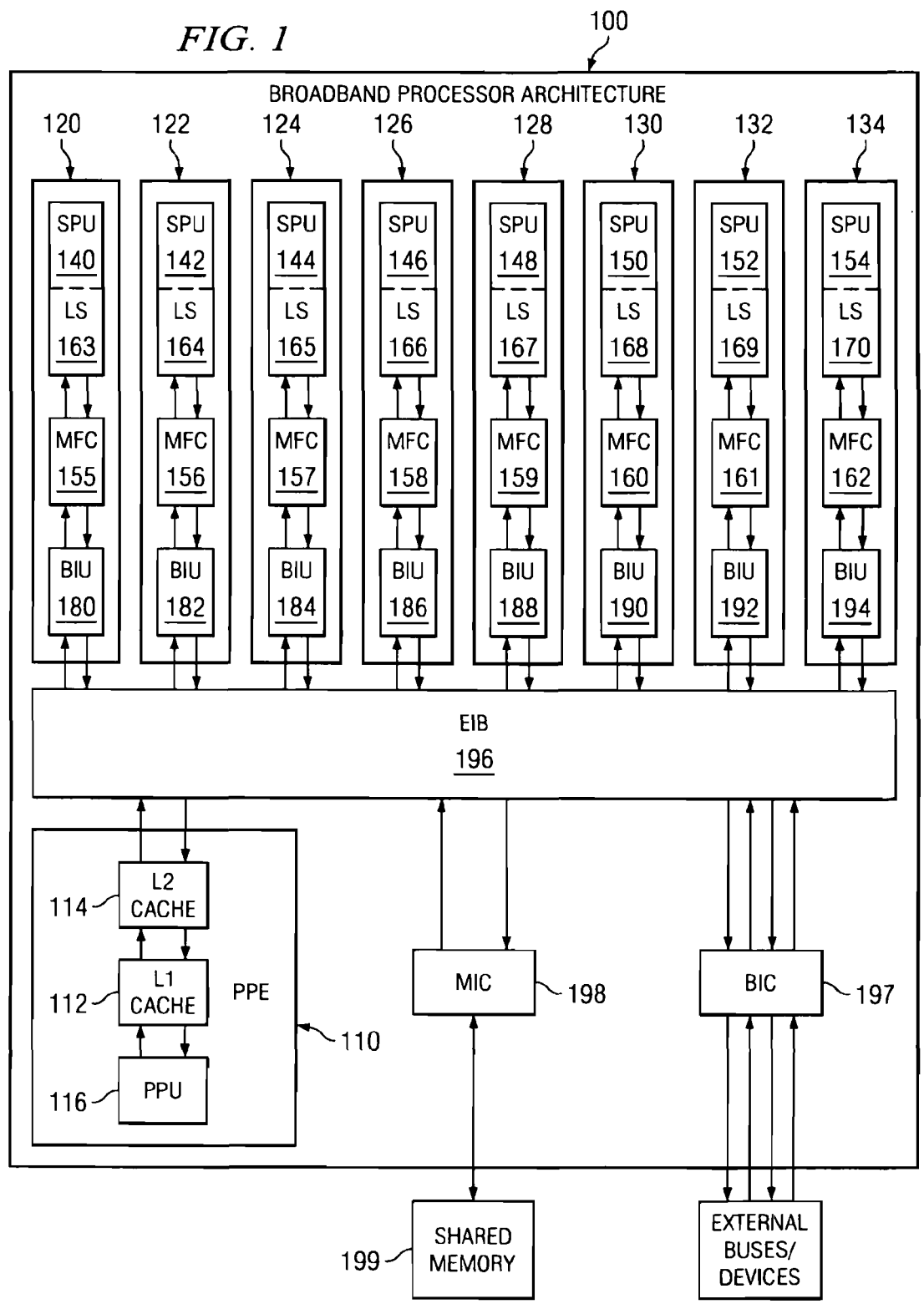
FIG. 1 is an exemplary diagram of an information handling device in which exemplary aspects of an illustrative embodiment may be implemented.

An illustrative embodiment provides an apparatus and method for handling data cache misses out-of-order for asynchronous pipelines. The mechanisms of the illustrative embodiment may be implemented in any microprocessor having a data cache and two or more asynchronous pipelines. FIG. 1 hereafter provides one example of a data processing system in which exemplary aspects of an illustrative embodiment may be implemented. FIG. 1 is provided only as an example and is not intended to state or imply any limitation with regard to the particular architectures in which the present invention may be implemented. Many modifications to the depicted architecture may be made without departing from the spirit and scope of the present invention.

FIG. 1 is an exemplary block diagram of a data processing system in which exemplary aspects of an illustrative embodiment may be implemented. The exemplary data processing system shown in FIG. 1 is an example of the Cell Broadband Engine architecture (CBEA) data processing system. While the CBEA will be used in the description of the illustrative embodiments, the present invention is not limited to such, as will be readily apparent to those of ordinary skill in the art upon reading the following description.

As shown in FIG. 1, the CBEA 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single-microprocessor chip. Moreover, the CBEA 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBEA 100 and other external buses and devices.

The PPE 110 is a dual threaded PPE 110. The combination of this dual threaded PPE 110 and the eight SPEs 120-134 makes the CBEA 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 160-174, and an interface unit 180-194. The local memory or store 160-174, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBEA 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 160-174. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The illustrative embodiments provide a mechanism for handling data cache misses in an out-of-order manner for asynchronous pipelines. The mechanism of the illustrative embodiments may be implemented in any of the SPUs or the PPU in the architecture shown in FIG. 1, for example. The mechanism includes a load table data structure and load target buffer unit for each asynchronous pipeline. This load table data structure is used to control out-of-order processing of a load instruction that resulted in a data cache miss.

FIG. 2 is an exemplary block diagram illustrating the operation of the primary elements of an illustrative embodiment. The elements shown in FIG. 2 may be present in any or all of the processors shown in FIG. 1 including one or more of the SPUs and the PPU. Thus, the various elements shown in FIG. 2 may be provided, for example, as part of an integrated circuit chip, a system-on-a-chip, a multi-chip package, or the like.

As shown in FIG. 2, the primary elements of the mechanism of the illustrative embodiment include an issue unit 210, a first pipeline 220 used for loading data from, and storing data to, a data cache, e.g., an L1 data cache, and a second pipeline 230 used for instruction execution. In addition, a load target buffer (LTB) 240 having a load table data structure 250, a load miss queue unit 260, and a register file storage device 270 are provided.

With the illustrative embodiment, load instructions are issued by the issue unit 210 to the two asynchronous pipelines 220 and 230. The issue unit 210 generates and associates a load tag (LTAG) identifier with the load instructions when dispatching them to asynchronous pipelines 220 and 230. This LTAG is used to keep track of each load instruction across the multiple pipelines 220 and 230 and is used to index into the load table data structure 250 of the load target buffer 240 to retrieve a corresponding load table entry.

Under normal operation of a load instruction, the data associated with the load instruction is readily available in, and retrieved from, the L1 data cache 280 using the load/store pipeline 220. The retrieved data is placed into the load table data structure 250 of the load target buffer 240 in an entry indexed by the LTAG of the corresponding load instruction. The load target buffer 250 essentially serves as a rename register for the load data before it is written into the register file storage device 270. The corresponding load table entry is marked as a "hit," indicating that the data is ready and valid for the second pipeline 230 to now use. When the same corresponding load instruction is ready to issue from a second pipeline 230, its LTAG is used to index into the load table 250 of the load target buffer 240 and retrieve the correct data to load into the register file storage device 270. The LTAG may then be de-allocated for future load instructions to use and the corresponding entry in the load table 250 is marked as de-allocate or "dealloc."

While this operation is rather simple when the data is readily available in the L1 data cache 280, complexity arises when the load instruction "misses" the L1 data cache 280 in the first pipeline 220, i.e., when the data is not readily available from the L1 data cache 280 and must be reloaded into the L1 data cache 280 from system memory or other storage. In this case, the load instruction is sent to both pipelines 220 and 230. The data corresponding to the load instruction is attempted to be retrieved from the L1 data cache 280 via the load/store pipeline 220. If the data is not available in the L1 data cache 280, the load/store pipeline 220 sends a "miss" message to the load target buffer 250. The corresponding entry in the load table data structure 240, identified based on the LTAG of the load instruction, is marked as a "miss," thereby identifying the data in this entry as being invalid.

In addition, the pipeline 220 sends a message to the load miss queue (LMQ) unit 260 notifying the LMQ unit 260 of the cache miss. The LMQ unit 260 requests and waits for the data to be retrieved, or recycled, from a component of the memory subsystem, such as the L2 cache 290. It should be appreciated that the recycling of data may be performed without regard to where in the memory subsystem the data is sourced from and is not limited to use of an L2 cache 290. For example, the recycling of data may be performed directly from main system memory or the like. For purposes of the description of the illustrative embodiments, it will be assumed that recycling operations are performed with regard to the L2 cache 290, however the present invention is not limited to such.

Once the data for the load instruction is returned to the LMQ unit 260, i.e. a recycle operation is completed using the L2 cache 290, the returned data is automatically placed into the L1 cache and is also sent from the LMQ unit 260 to the load target buffer 250 along with the LTAG corresponding to the load instruction recycled from the L2 cache or other memory subsystem.

Either the LMQ unit 260 or the L2 cache 290 keeps track of the LTAGs associated with each L2 recycle, depending upon the particular implementation. In other words, the LMQ unit 260 or L2 cache 290 may maintain a data structure identifying the LTAG, load address, and the like, for each load instruction that is subject to a L2 recycle operation. When the data is returned, either the LMQ unit 260 or the L2 cache 290 may correlate the data with the particular entry in this data structure using the load address. The corresponding LTAG may then be returned with the data. This permits load data to be recycled from the L2 cache 290 in any order, i.e. not necessarily in the same order as the order in which requests for data were sent out to the L2 cache 290.

The LTAG and data sent from the LMQ unit 260 to the load target buffer 240 are used to access a corresponding entry in the load table data structure 250. Based on the LTAG, the entry is updated to include the recycled data and the entry is marked as a "hit" if the recycled data is valid. The LMQ unit 260 determines if the recycled data is valid or not and identifies the recycled data as valid/invalid when providing it to the load target buffer 240. The recycled data may be invalid, for example, when the recycled data for a speculative recycle comes from the L2 cache, which itself stores invalid data. As a further example, the recycled data may be invalid if there are collisions in the recycle operation which require the recycled data to be resent. Thus, in some cases, the recycled data may not be valid in which case the corresponding load table data structure 250 entry is left marked as a "miss."

The load instruction in the instruction pipeline 230 may be anywhere in the pipeline 230 at the time that the recycled data is stored in the load target buffer 240. For example, the load instruction may still be in pipeline 230 or it may have already tried to issue and access the load table data structure 250 in load target buffer 240.

If the load instruction is still in the pipeline 230 when the recycling of data from the L2 cache 290 completes, the corresponding load table data structure 250 entry is changed from a "miss" state to a "hit" state before the load instruction issues from the pipeline 230. From the perspective of the load instruction, it appears as if the loading of the data never "missed" in the first place and the load instruction issues as normal. Thus, the load table data structure 250 entry in the load target buffer 240 is read, based on the LTAG, to gather the data corresponding to the entry and store that data to the register file 280. The LTAG and load table data structure 250 entry, associated with the load instruction, may then be de-allocated so that the LTAG may be used with a subsequent load instruction.

If the load instruction has already issued from the pipeline 230, handling the L1 data cache "miss" is more complex. When the load instruction issues from the instruction pipeline 230 and its corresponding entry in the load table data structure 250, as determined by the LTAG, is marked as a "miss," any effects from the load instruction having been issued must be canceled. For example, steps must be taken to ensure that invalid load data is not written into the register file 280, to not de-allocate the LTAG associated with the load instruction, and the like. Thus, with the mechanism of the illustrative embodiment, when an entry in the load table data structure 250 indicates a "miss," the data in this entry is either not read and written to the register file 280 or the data that was written to the register file 280 from this entry is invalidated in the register file 280, e.g., a validity bit in the register file 280 is set to an invalid state value. Moreover, the LTAG and load table data structure 250 entry are not de-allocated. Rather, the entry in the load table data structure 250 has its state updated from a "miss" state to a "pending" state indicating that the entry is awaiting a recycle of the data from the L2 cache 290.

In addition, the load instruction itself, or some resemblance of the load instruction, is stored in the load table data structure 250 entry for future reissue. In this way, the load table data structure 250 entry effectively serves as a load miss queue entry until the load data becomes available from the L2 cache 290 and is valid. When the recycle of the data occurs from the L2 cache 290, the corresponding entry in the load table data structure 250, as identified by the LTAG, is marked as a "hit." As a result, the load instruction that is stored in the load table data structure 250 entry is restored to the pipeline 230 and eventually reissued from pipeline 230. When the reissued load instruction issues from the pipeline 230, it is processed as normal, i.e. data is read from the load table data structure 250 in the load target buffer 240 and written into the register file 280 and the LTAG and load table data structure 250 entry are de-allocated.

As mentioned above, the recycle of the load instruction's data from the L2 cache 290 may be speculative and thus, the data that is reloaded into the load target buffer 240 may be invalid. In such a case, the corresponding load table data structure 250 entry is left marked as a "miss." As a result, when the load instruction is re-issued from the instruction pipeline 230, the process described above is repeated again until the data stored in the load table data structure 250 entry is valid. The entry must eventually become valid since valid data must eventually arrive from the memory subsystem.

Figure 3A:
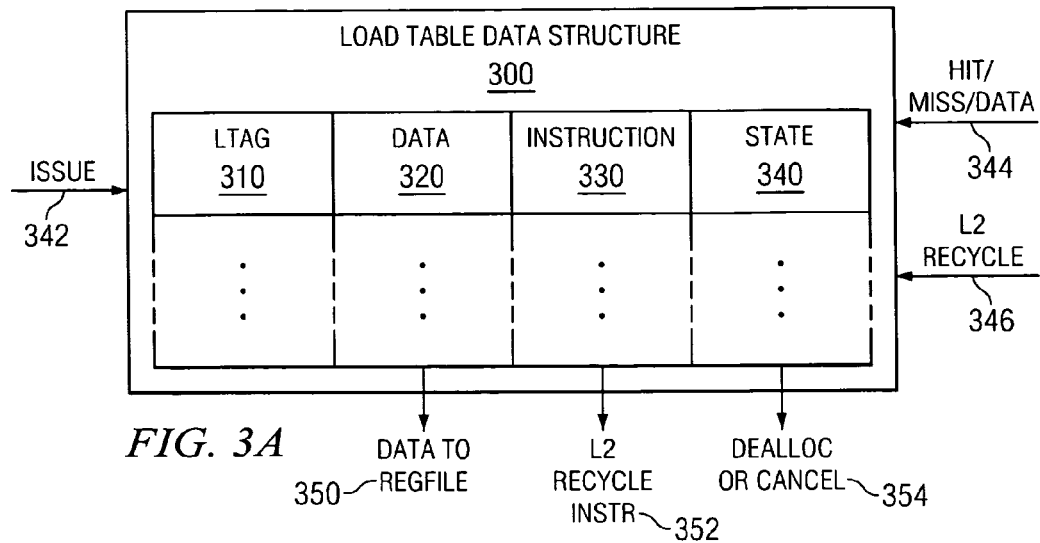
FIG. 3A is an exemplary diagram illustrating a load table of a load target buffer in accordance with an illustrative embodiment.
Figure 3B:
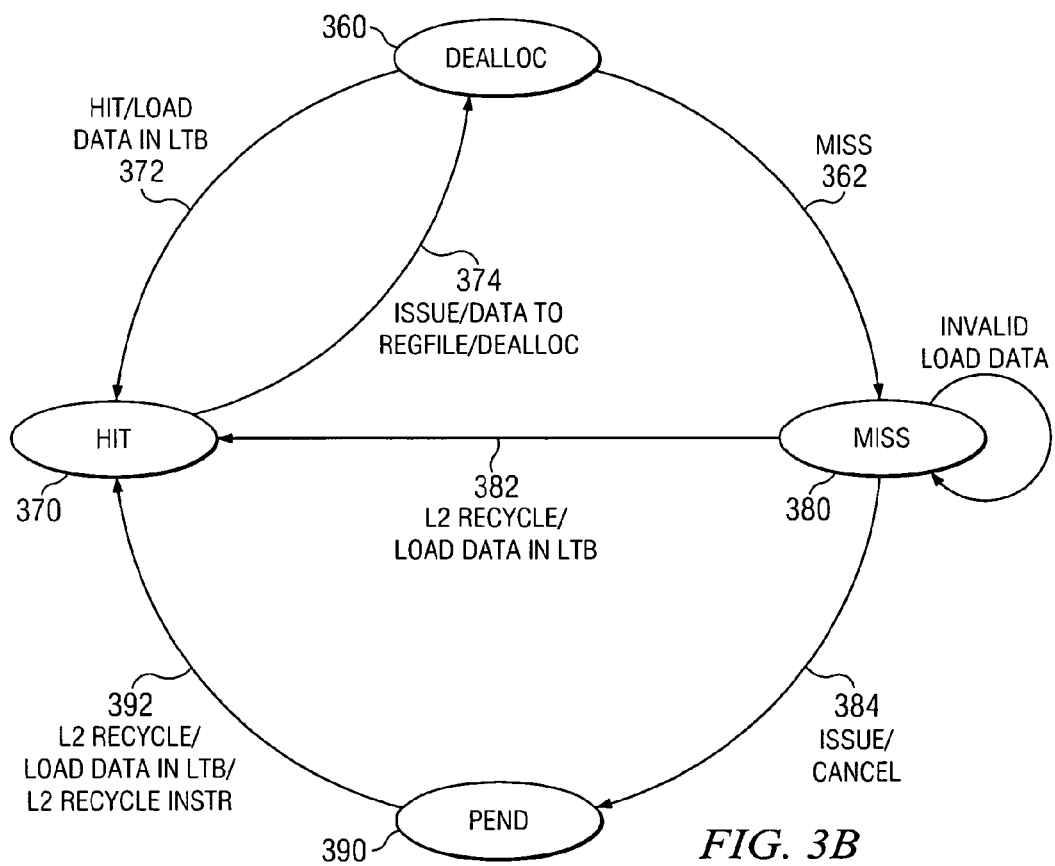
FIG. 3B is an exemplary state diagram illustrating the states of the entries in the load table of the load target buffer of FIG. 3A in accordance with an illustrative embodiment.

FIG. 3A is an exemplary diagram illustrating a load table of a load target buffer in accordance with an illustrative embodiment. The load target buffer of the illustrative embodiment includes the load table shown in FIG. 3A and a state machine whose states and transitions are shown in FIG. 3B. As shown in FIG. 3A, entries in the load table 300 are indexed by the LTAG 310 of the load instruction to which they correspond. The entries in the load table 300 may include data 320 corresponding to the load instruction, the instruction 330, and a current state 340 of the load instruction. It should be noted that while FIG. 3A shows the LTAG 310 as being part of the entries in the load table 300 for descriptive purposes, in actuality the LTAG 310 serves as an index into the load table 300 and may not actually be part of the entries themselves. However, in an alternative embodiment, the LTAG may be made part of the load table 300. In such an embodiment, a process for performing a lookup of the LTAG 310 would be utilized to find a particular entry in the load table 300. This alternative embodiment would be more expensive and slower than indexing the load table 300 by the LTAG 310, as in the preferred embodiment.

As shown in FIG. 3A, inputs to the load table 300 include the issued instruction 342 from the instruction pipeline. An input 344 is also provided from the load/store pipeline indicating a LTAG of the load instruction, an indicator of whether a L1 data cache hit or miss has occurred, and if a L1 data cache hit occurred, the data for the load instruction. A further input 346 from the load miss queue unit is provided that includes the LTAG of the load instruction and the data for the load instruction recycled from the L2 data cache.

Outputs from the load table 300 include an output 350 of the data from the load table entry which is stored in the register file when a load instruction properly issues and the data for the load instruction is present and valid in the load table 300. A further output 352 is the recycled load instruction that is restored in the instruction pipeline when data is recycled from the L2 data cache. In addition, an output 354 to de-allocate or cancel a LTAG and corresponding load table entry is provided.

If a load instruction is successfully issued without exception, then it's LTAG can be de-allocated for future use by a different load instruction using the "de-allocate" line of the output 354. The LTAGs are maintained by a separate LTAG-management device (not shown), which allocates upon issuing the instruction from the issue unit 210 in FIG. 2, and de-allocates LTAGs as mentioned above. The "cancel" line of the output 354 goes to an execution unit that contains the register file. The "cancel" output is assert upon an unsuccessful issue of a load, which either has an exception or some other problem which renders the load data invalid. A canceled load cannot have it's LTAG de-allocated. The "cancel" output effectively cancels the load in the execution unit, which prevents it from finishing and writing it's results to the register file.

FIG. 3B is an exemplary state diagram illustrating the states of the entries in the load table of the load target buffer of FIG. 3A in accordance with an illustrative embodiment. As shown in FIG. 3B, the state of an entry starts at the de-allocate, or "dealloc" state 360. The "dealloc" state 360 indicates that the LTAG is available for allocation to a load instruction. When a load instruction is sent to the asynchronous pipelines, and a L1 data cache hit occurs, i.e. the data for the load instruction is present in the L1 data cache and is retrieved, the state of the entry transitions 372 to the "hit" state 370. In the "hit" state 370, the LTAG is allocated to the load instruction and the data for the load instruction is made available in the corresponding entry in the load table.

From the "hit" state 370, when the load instruction issues from the instruction pipeline, a transition 374 from the "hit" state 370 to the "dealloc" state 360 is made in which the data is loaded or stored into the register file and the LTAG and load table entry are de-allocated.

When a load instruction is sent to the asynchronous pipelines, and a L1 data cache miss occurs, i.e. the data for the load instruction is not present in the L1 data cache or is invalid, the state of the entry transitions 362 from the "dealloc" state 360 to the "miss" state 380. In the "miss" state 380, the LTAG is allocated to the load instruction, but the data for the load instruction is not made available through the entry in the load table.

From the "miss" state 380, when valid data is recycled from the L2 data cache, a transition 382 to the "hit" state 370 is made. During this transition, the data is loaded into the load table entry corresponding to the load instruction's LTAG. Of course, if the data that is returned by the recycle operation is invalid, then the entry in the load table remains in a "miss" state 380. If the load instruction issues from the instruction pipeline while the load instruction's entry in the load table is in a "miss" state 380, any effects of the load instruction issuing are canceled and the state of the entry in the load table transitions 384 to a pending or "pend" state 390. In the "pend" state 390, the data corresponding to the load instruction is not available, and the load instruction is pending a L2 data cache recycle operation.

From the "pend" state 390, once valid data for the load instruction is recycled from the L2 data cache, a transition from the "pend" state 390 to a "hit" state 370 is made. As part of this transition, the recycled data is loaded into the load table and the load instruction is restored to the instruction pipeline.

It should be noted that exceptions may occur on instructions that are older than the load instruction that is the subject of the mechanisms of the illustrative embodiments. This means that the load instructions in the asynchronous pipelines must be invalidated. With the illustrative embodiments, two different methods are provided for dealing with this eventuality.

In a first method, the load instruction is immediately invalidated in the asynchronous pipelines themselves. This may involve, for example, setting a bit or flag on the load instructions indicating that they are invalid. For example, if the timing of the invalidation is fixed, the location of the load instruction in the instruction pipeline may be recreated and the load instruction may be invalidated. If the timing of the invalidation is not fixed, then a tag-based scheme may be used wherein a flush operation broadcasts a tag into the load instruction can identify and, as a result, invalidate itself. If the load instruction has already issued from the load/store pipeline to the load target buffer and/or the load miss queue unit, then the entries in the load table and/or load miss queue unit for the corresponding load instruction must be invalidated as well, i.e. their state is reset to "dealloc" and the LTAG is de-allocated.

In an alternative method, the load instruction is immediately invalidated in the load/data pipeline and/or the load miss queue unit but the entry in the load table is only marked as being invalidated due to an exception. This marking is done by introducing a "F" bit to each load table entry and having this "F" bit set when the entry is invalidated due to an exception having occurred. The load instruction is not invalidated in the instruction pipeline but rather, is allowed to issue and access the load table. If a load issues and a corresponding "F" bit is set in the corresponding entry of the load table, then the effects of the load instruction are canceled, i.e. the data loaded or stored to the register file is invalidated, etc. The LTAG of the load instruction may also be de-allocated since the load instruction is flushed due to an exception. This alternative method is a simpler implementation that the first method since it prevents the complexity of having to find and immediately invalidate the load instruction in the instruction pipeline, especially if the exception is caused by the load/store pipeline which is asynchronous in relation to the instruction pipeline.

Figure 4A:
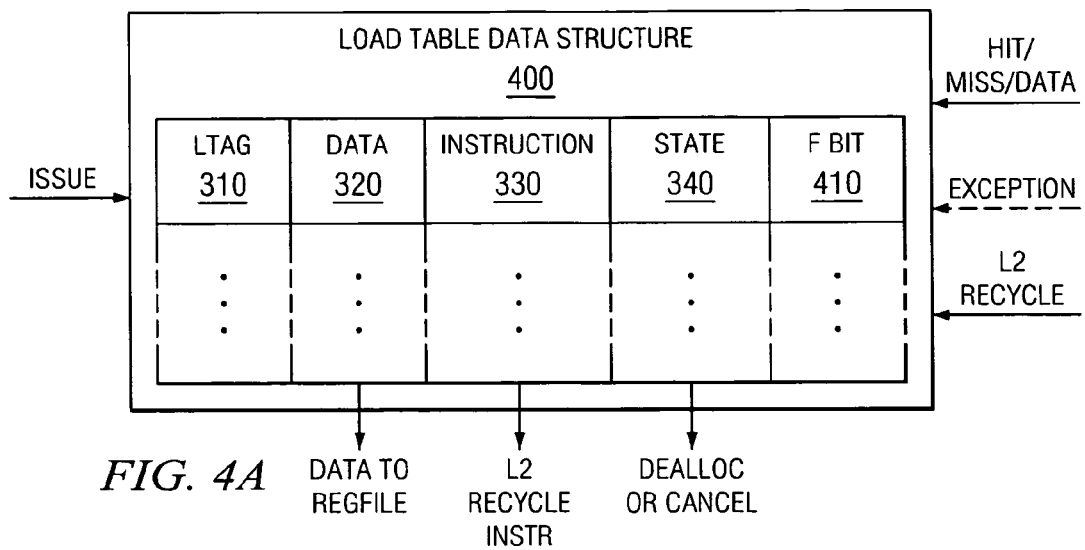
FIG. 4A is an exemplary diagram illustrating a load table in accordance with another illustrative embodiment.

FIG. 4A is an exemplary diagram illustrating a load table in accordance with another illustrative embodiment. The load table shown in FIG. 4A is very similar to the load table shown in FIG. 3A with the addition of the "F" bit 410 in the entries of the load table 400. As shown in FIG. 4A, when an exception occurs, this exception causes the "F" bit 410 for load table entries corresponding to load instructions in the load/store pipeline to be set. The particular entries in the load table 400 that are to have their "F" bits set may be identified based on the LTAG for these load instructions, for example.

Figure 4B:
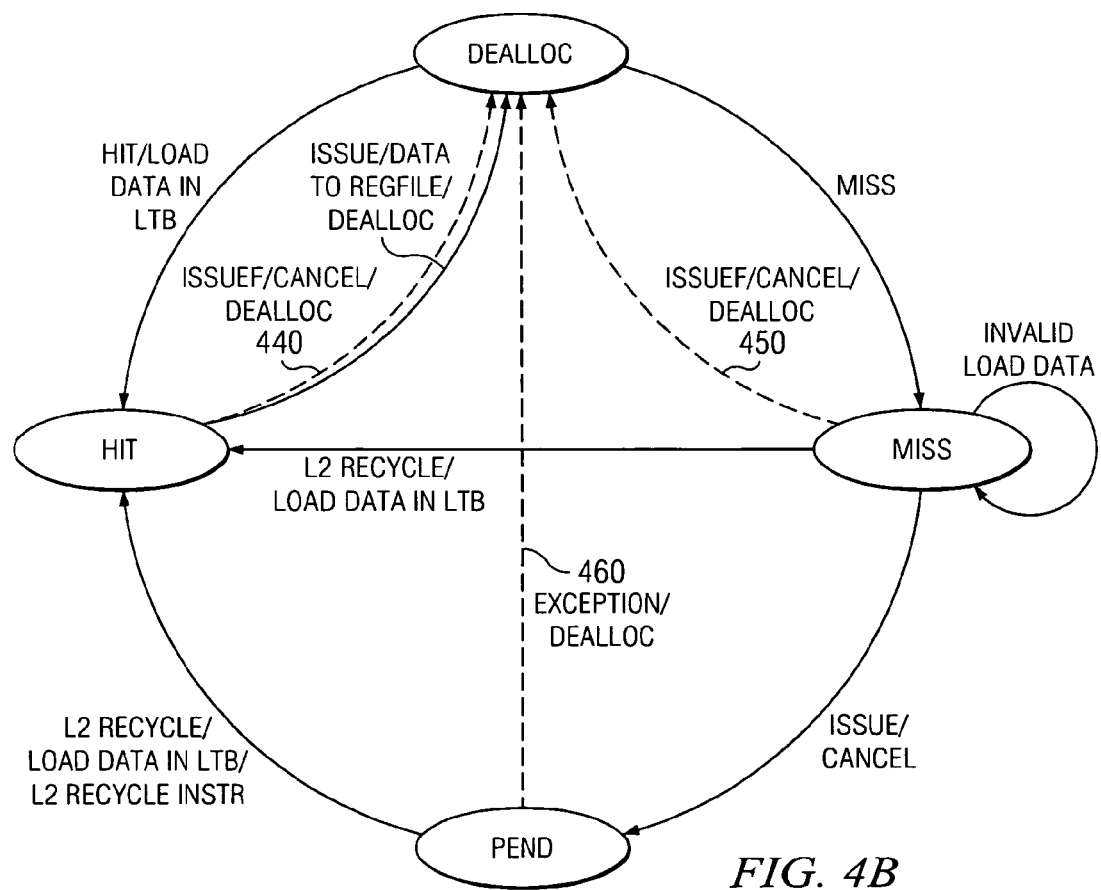
FIG. 4B is an exemplary state diagram illustrating the states of the entries in the load table of FIG. 4A in accordance with an illustrative embodiment.

FIG. 4B is an exemplary state diagram illustrating the states of the entries in the load table of FIG. 4A in accordance with an illustrative embodiment. The state diagram is similar to that of FIG. 3B with the main differences being the addition of transitions 440-460 between the "miss," "hit," and "pend" states and the "dealloc" state. With these transitions, the term "issueF" refers to an issue for a load with its F bits set in the load table. If the load table entry for the load instruction is in a "hit" state or the "miss" state, and the entry's F bit is set, the effects of the issuing of the load instruction are canceled and LTAG and load table entry are de-allocated (transitions 440 and 450). If the load table entry for the load instruction is in a "pend" state, and the entry's F bit is set, the load instruction's LTAG is de-allocated and the entry is marked as being in a "dealloc" state. There is no need to wait on the L2 recycle operation in this case.

Most in-order processors have one final exception point in the pipeline where no exceptions are allowed past that point and no architected registers are yet updated. With such a processor, flushing instructions on an exception is fairly simple as the instructions can either be removed from the pipeline or marked as invalid and simply re-fetched and reissued along the normal execution path in a manner described above. However, a processor may allow exceptions past this point, i.e. late exceptions, which adds significant complexity, as it is no longer possible to merely mark the instructions as invalid and re-fetch them.

One solution to the late exceptions is for the processor to employ a special "pipeline recycle" mechanism where the instructions younger than the exception that have already been issued must be reissued locally within the pipeline. An example implementation of this approach is provided in commonly assigned and co-pending U.S. patent application Ser. No. 11/184,349, entitled "Improving Performance of an In-Order Processor by No Longer Requiring a Uniform Completion Point Across Different Execution Pipelines."

Figure 5:
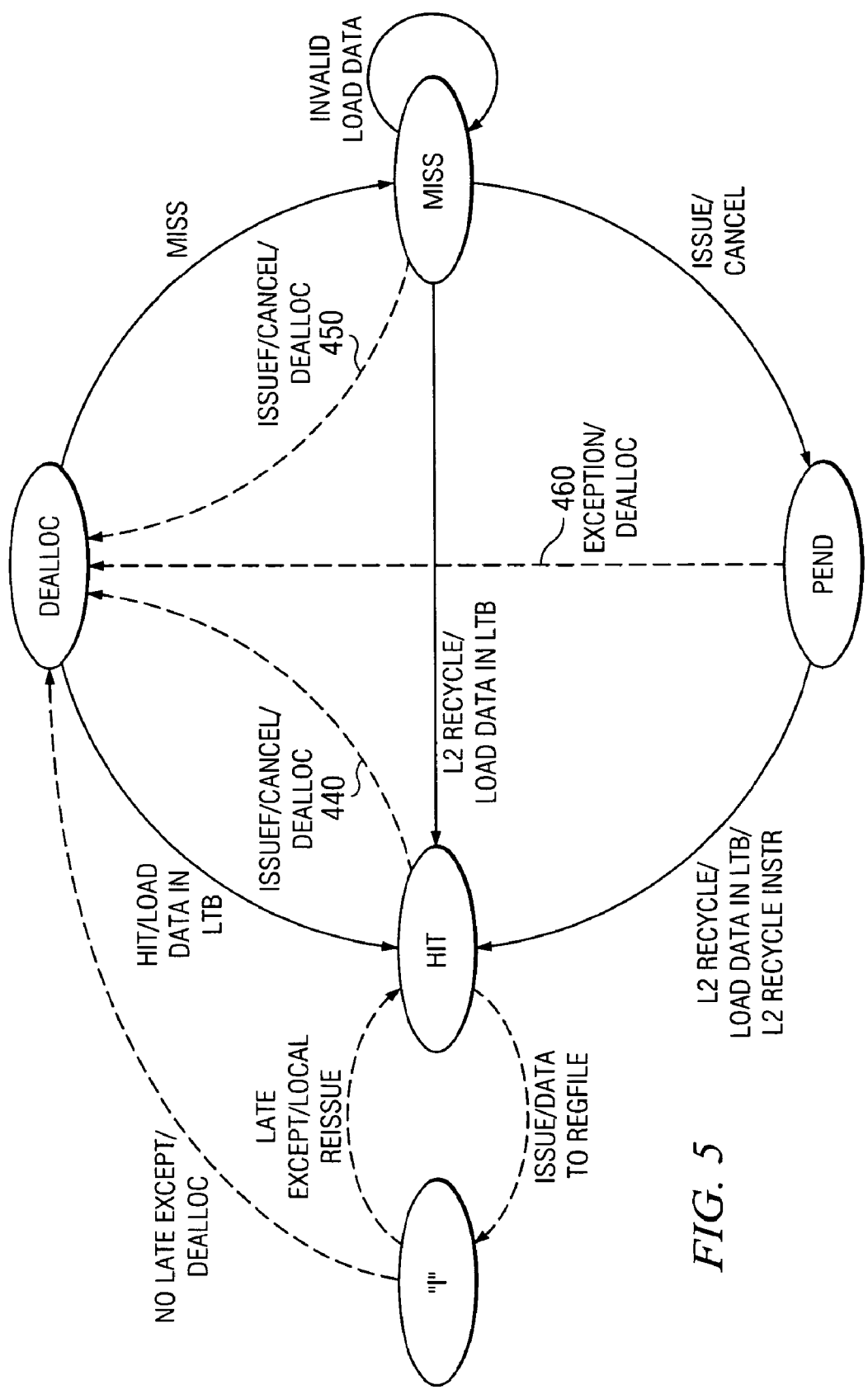
FIG. 5 is an exemplary state diagram illustrating the inclusion of a new "I" state into the state diagram of FIG. 4B in accordance with one illustrative embodiment.

A new "I" state may be provided in which the load has already been issued. FIG. 5 is an exemplary state diagram illustrating the inclusion of this new "I" state into the state diagram of FIG. 4B. The "I" state is a final resting point after a load instruction is issued before de-allocating itself. When the load instruction issues, the load table entry is temporarily placed in the "I" state 510 (transition 512). The load instruction remains in this "I" state 510 after the load instruction is issued until the load instruction is past the late exception point. If there is no late exception forcing a local reissue when the load instruction is beyond the late exception point, then the load instruction can be de-allocated (transition 514). If there is a late exception forcing the load instruction to reissue locally, then the load instruction's load table entry is returned to the "hit" state, waiting to be reissued and the process repeats itself.

It should be noted that the load instruction may be de-allocated right away from the "hit" state if issued and it is marked as flushed, not having to wait until the late exception point. If the load is in the pending state, and an L2 data cache recycle operation occurs, a normal transition to the "hit" state is caused and then to the "I" state as if the load instruction were issued the first time with a "hit." If a late exception occurs while the load instruction is in the pending state, it does not matter to the load instruction since it has not been reissued yet.

Figure 6:
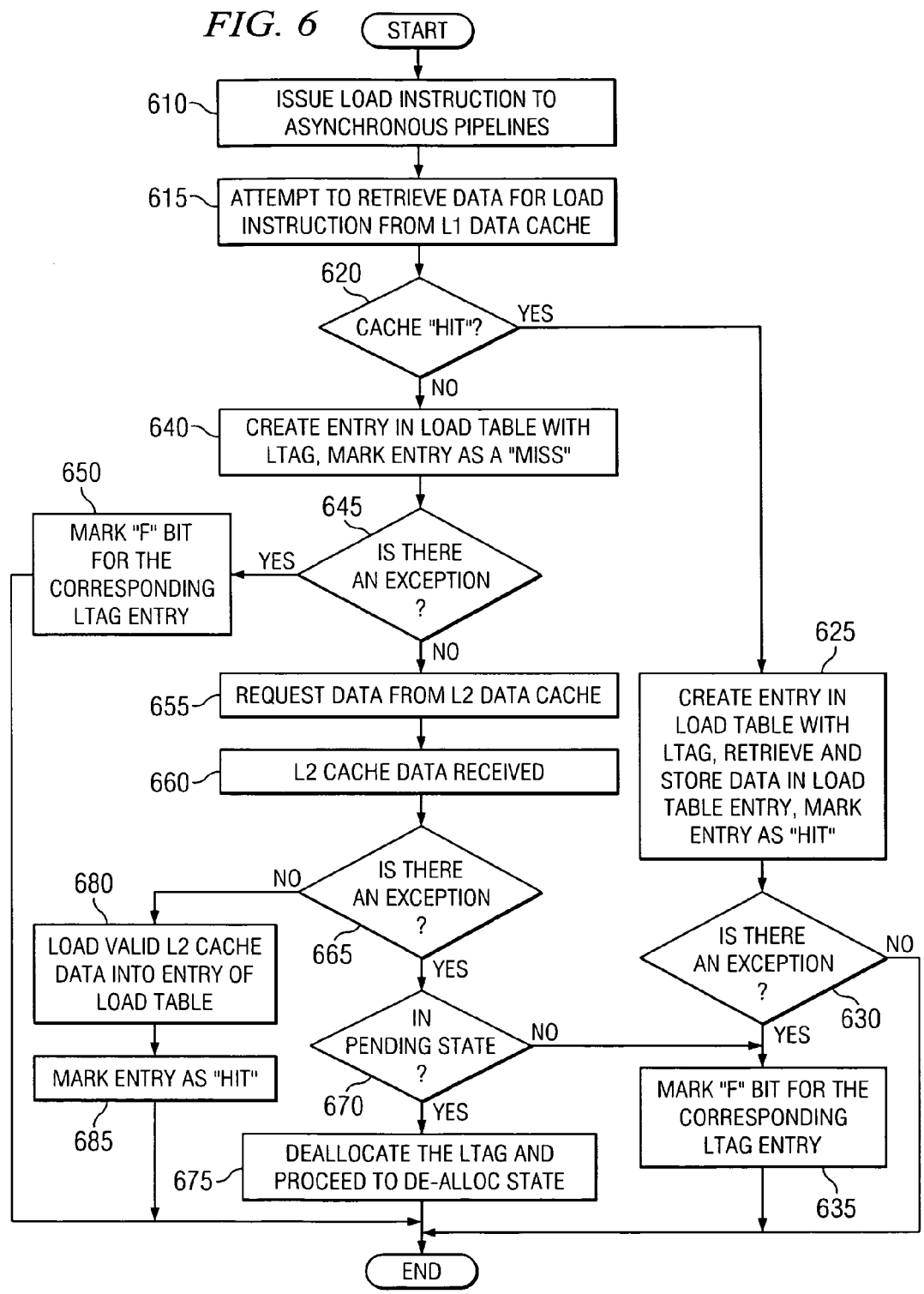
FIG. 6 is a flowchart outlining an exemplary operation of a load/store pipeline in accordance with one illustrative embodiment.
Figure 7:
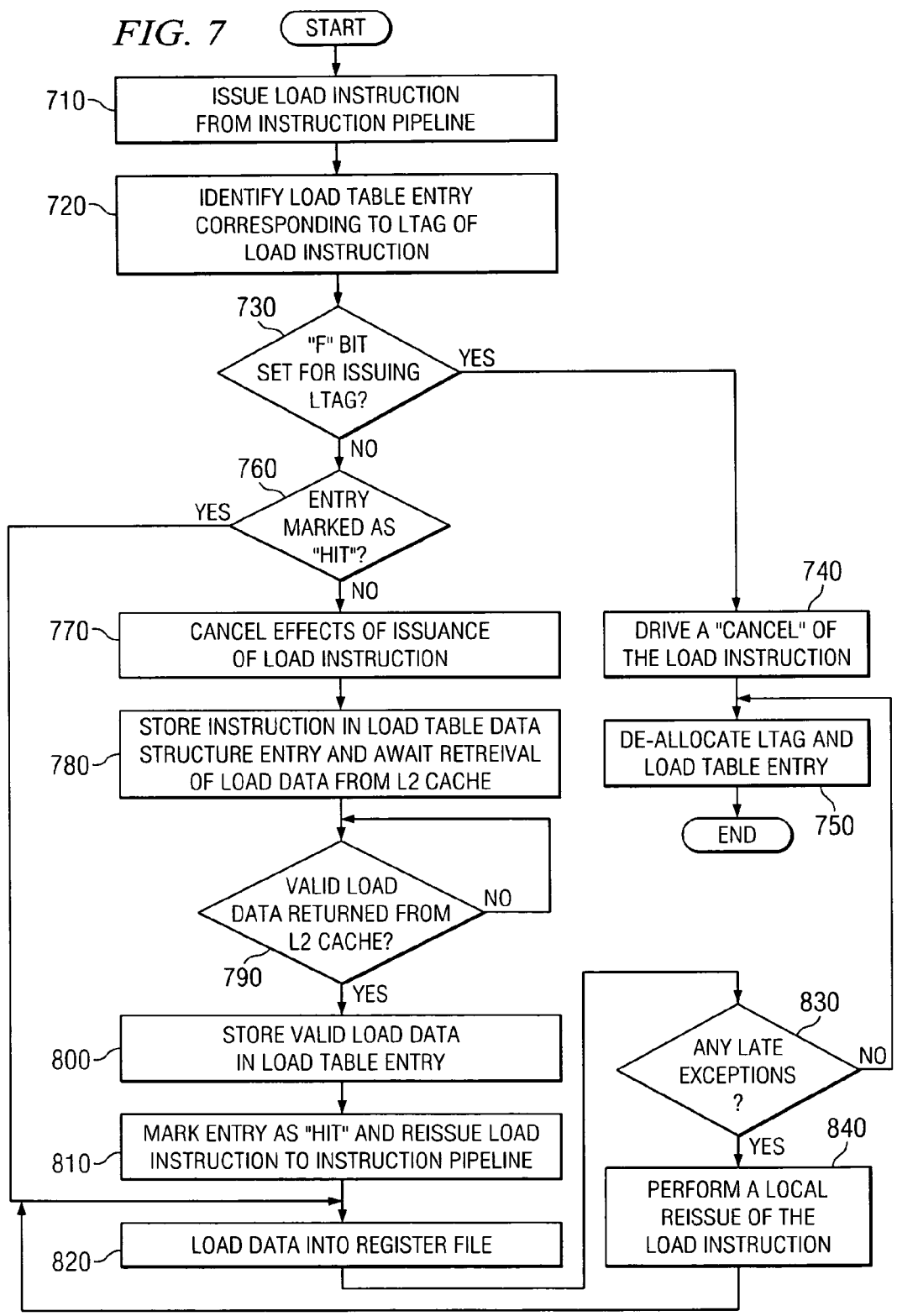
FIG. 7 is a flowchart outlining an exemplary operation of an instruction pipeline in accordance with one illustrative embodiment.

FIGS. 6 and 7 are flowcharts outline exemplary operations of one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation of a load/store pipeline in accordance with one illustrative embodiment. As shown in FIG. 6, the operation starts with an issue unit issuing a load instruction to two or more asynchronous pipelines (step 610). The load/store pipeline attempts to retrieve the data for the load instruction from the L1 data cache (step 615) and determines if the attempt results in a cache "hit" (step 620). If the attempt results in a cache "hit," the load table buffer creates an entry in a load table with the LTAG of the load instruction and the data corresponding to the load instruction retrieved from the L1 data cache, and marks the entry as having a "hit" state (step 625).

The load/store pipeline determines if an exception is present on the entry in the load table (step 630). If not, the operation terminates. If an exception is present, the load/store pipeline marks the "F" bit for the corresponding LTAG entry (step 635) and the operation then terminates. It should be noted that, with regard to FIG. 6, the exceptions referred to are exceptions generated from the load/store pipeline.

If the attempt to retrieve the data from the L1 cache results in a cache "miss," the load miss queue unit creates an entry in the load table having the LTAG for the load instruction and marks the entry as having a "miss" state (step 640). The load miss queue unit determines if there is an exception generated by the cache "miss" (step 645). If an exception has occurred, a "F" bit for the corresponding LTAG entry is marked (step 650) and the operation terminates.

If an exception has not occurred in step 645, the load miss queue unit requests the data for the load instruction from the L2 data cache (step 655). The data from the L2 data cache is then received (step 660) and a determination is made as to whether an exception occurred during the retrieval of the data from the L2 data cache (step 665). If no exception occurred, the valid data from the L2 data cache is loaded into the corresponding entry in the load table (step 680) and the entry is marked as a "hit" (step 685).

If an exception was generated during the retrieval of data from the L2 data cache (step 665), a determination is made as to whether the LTAG entry in the load table is in a pending state (step 670). If not, then the "F" bit for the corresponding LTAG entry in the load table is set (step 635). If the LTAG entry in the load table is in a pending state (step 670), the LTAG is de-allocated and the LTAG entry proceeds to a de-allocate state (step 675). The operation then terminates.

FIG. 7 is a flowchart outlining an exemplary operation of an instruction pipeline in accordance with one illustrative embodiment. As shown in FIG. 7, the operation starts with the instruction pipeline issuing the load instruction (step 710). The load target buffer identifies an entry in the load table data structure corresponding to the LTAG of the issued load instruction (step 720) and a determination is made as to whether the "F" bit for this entry has been set (step 730). If so, the load target buffer drives a "cancel" operation of the load instruction (step 740) and the LTAG and load table entry are de-allocated (step 750).

If the "F" bit for the entry corresponding to the LTAG of the issued load instruction is not set (step 730), the load target buffer determines whether the entry is marked as a "hit" (step 760). If the entry is marked as a "hit", then the load target buffer loads the data in the entry of the load table into the register file (step 820). The load target buffer determines if a late exception has occurred (step 830). It should be noted that, with regard to FIG. 7, the exceptions are exceptions generated by the instruction pipeline and its execution units.

If no late exception has occurred, the LTAG and load table entry are de-allocated (step 750). If a late exception has occurred, the load target buffer performs a local reissue of the load instruction (step 840) and the operation returns to step 820.

If the entry is not marked as a "hit" (step 760), the load target buffer cancels any effects of the issuance of the load instruction (step 770) and stores the instruction in the load table data structure entry awaiting retrieval of data from the L2 data cache (step 780). The load target buffer determines whether valid load data is returned from the L2 data cache (step 790). If not, the operation returns to step 790 until valid data is returned from the L2 data cache. If valid load data for the load instruction is recycled from the L2 data cache, the load target buffer stores the recycled load data in the load table entry for the load instruction (step 800). The load target buffer then marks the entry as a "hit" and reissues the load instruction to the instruction pipeline (step 810). The operation then proceeds to steps 820-840 as described previously above.

Thus, the illustrative embodiments of the present invention provide mechanisms for handling data cache misses out-of-order for asynchronous pipelines. The mechanisms of the illustrative embodiments further provide a way of handling late exceptions in asynchronous pipelines.

The mechanisms of the illustrative embodiments may be provided in a one or more processors of a microprocessor architecture. As such, the mechanisms of the illustrative embodiments may be implemented in integrated circuits on integrated circuit chips. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable medium having a computer readable program, wherein the computer readable program, when executed on a computing device, causes the computing device to:

receive a load instruction;

associate the load instruction with a load tag (LTAG);

issue the load instruction and the LTAG to the load/store pipeline;

attempt to retrieve data corresponding to the load instruction from a first cache;

determine whether the attempt to retrieve the data corresponding to the load instruction results in a cache hit or a cache miss; and generate an entry in a load table data structure of a load target buffer based on the LTAG and results of the attempt to retrieve data corresponding to the load instruction, wherein the computer readable program causes the computing device to generate an entry in the load table data structure by:

generating an entry in the load table that is indexed by the LTAG associated with the load instruction; and marking the entry as a cache hit or a cache miss based on results of determining whether the attempt to retrieve the data corresponding to the load instruction results in a cache hit or a cache miss, and wherein if the results of the computing device's determining are that a cache miss has occurred, the computer readable program causes the computing device to:

recycle the data corresponding to the load instruction from a memory subsystem; and store the recycled data in the entry in the load table.

2. The computer program product of claim 1, wherein the computer readable program causes the computing device to recycle the data corresponding to the load instruction from a memory subsystem by:

maintaining, in a load miss queue unit, a data structure identifying the LTAG associated with the load instruction and a load address associated with the load instruction corresponding to the data that is being recycled; and correlating the recycled data with the load instruction based on the data structure in the load miss queue unit in response to the recycling of the data from the memory subsystem, wherein the recycled data is stored in the entry in the load table based on the LTAG of the load instruction identified in the data structure in the load miss queue unit.

3. The computer program product of claim 1, wherein the computer readable program further causes the computing device to:

mark the entry in the load table as a cache hit only if the recycled data is valid; and mark the entry in the load table as a cache miss if the recycled data is invalid.

4. The computer program product of claim 1, wherein the instruction pipeline and the load/store pipeline are asynchronous with respect to one another.

5. The computer program product of claim 1, wherein the computing device is a processor.

6. The computer program product of claim 1, wherein the computing device is a multiprocessor heterogeneous data processing system.

7. The computer program product of claim 6, wherein the multiprocessor heterogeneous data processing system comprises a control process and one or more co-processors, and wherein the computing device is one of more of the control processor or a co-processor.

8. A computer program product comprising a computer useable medium having a computer readable program, wherein the computer readable program, when executed on a computing device, causes the computing device to:

receive a load instruction;

associate the load instruction with a load tag (LTAG);

issue the load instruction and the LTAG to the load/store pipeline;

attempt to retrieve data corresponding to the load instruction from a first cache;

determine whether the attempt to retrieve the data corresponding to the load instruction results in a cache hit or a cache miss;

generate an entry in a load table data structure of a load target buffer based on the LTAG and results of the attempt to retrieve data corresponding to the load instruction, issue the load instruction and the LTAG to the instruction pipeline;

issue the load instruction from the instruction pipeline to the load target buffer;

identify an entry in the load table corresponding to the issued load instruction based on the LTAG associated with the issued load instruction; and determine whether to store the data corresponding to the load instruction in a register file based on whether the identified entry in the load table is marked as a cache miss or a cache hit.

9. The computer program product of claim 8, wherein the computer readable program further causes the computing device to:

store the data corresponding to the load instruction in the register file if it is determined that the identified entry is marked as a cache hit.

10. The computer program product of claim 8, wherein the computer readable program further causes the computing device to:

cancel any effects of the issuing of the load instruction from the instruction pipeline if it is determined that the identified entry in the load table is marked as a cache miss; and update the identified entry in the load table as having a pending state if it is determined that the identified entry in the load table is marked as a cache miss.

11. The computer program product of claim 10, wherein the computer readable program further cause the computing device to:

store a representation of the load instruction in the identified entry of the load table if it is determined that the identified entry in the load table is marked as a cache miss; and reissue the load instruction to the instruction pipeline based on the representation of the load instruction in the identified entry in response to the data corresponding to the load instruction being recycled from a memory subsystem.

12. The computer program product of claim 9, wherein the computer readable program further causes the computing device to:

de-allocate the LTAG and the entry in the load table following storing the data corresponding to the load instruction in the register file.

\* \* \* \* \*